May 31, 1938. C. W. AVERY 2,119,193
VEHICLE BODY AND CHASSIS CONSTRUCTION
Filed April 22, 1933 4 Sheets-Sheet 1
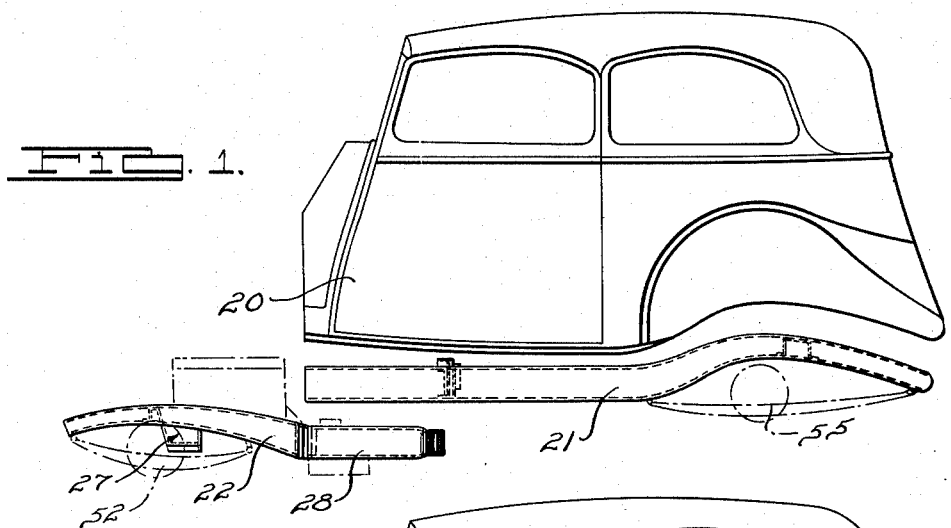
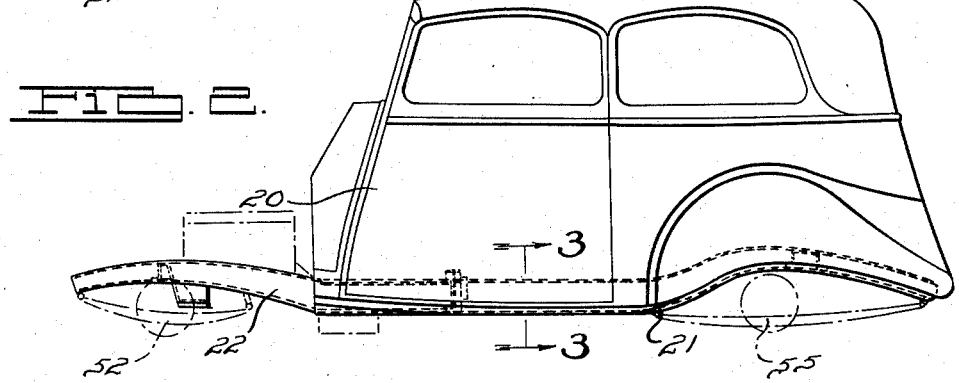
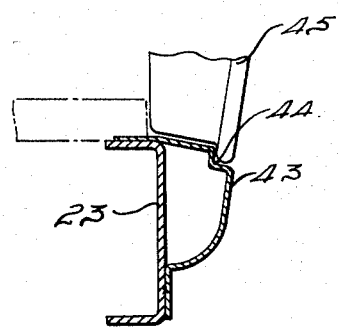
INVENTOR.
Clarence W. Avery,
BY
Harness, Dickey, Pierce & Hann
ATTORNEYS.

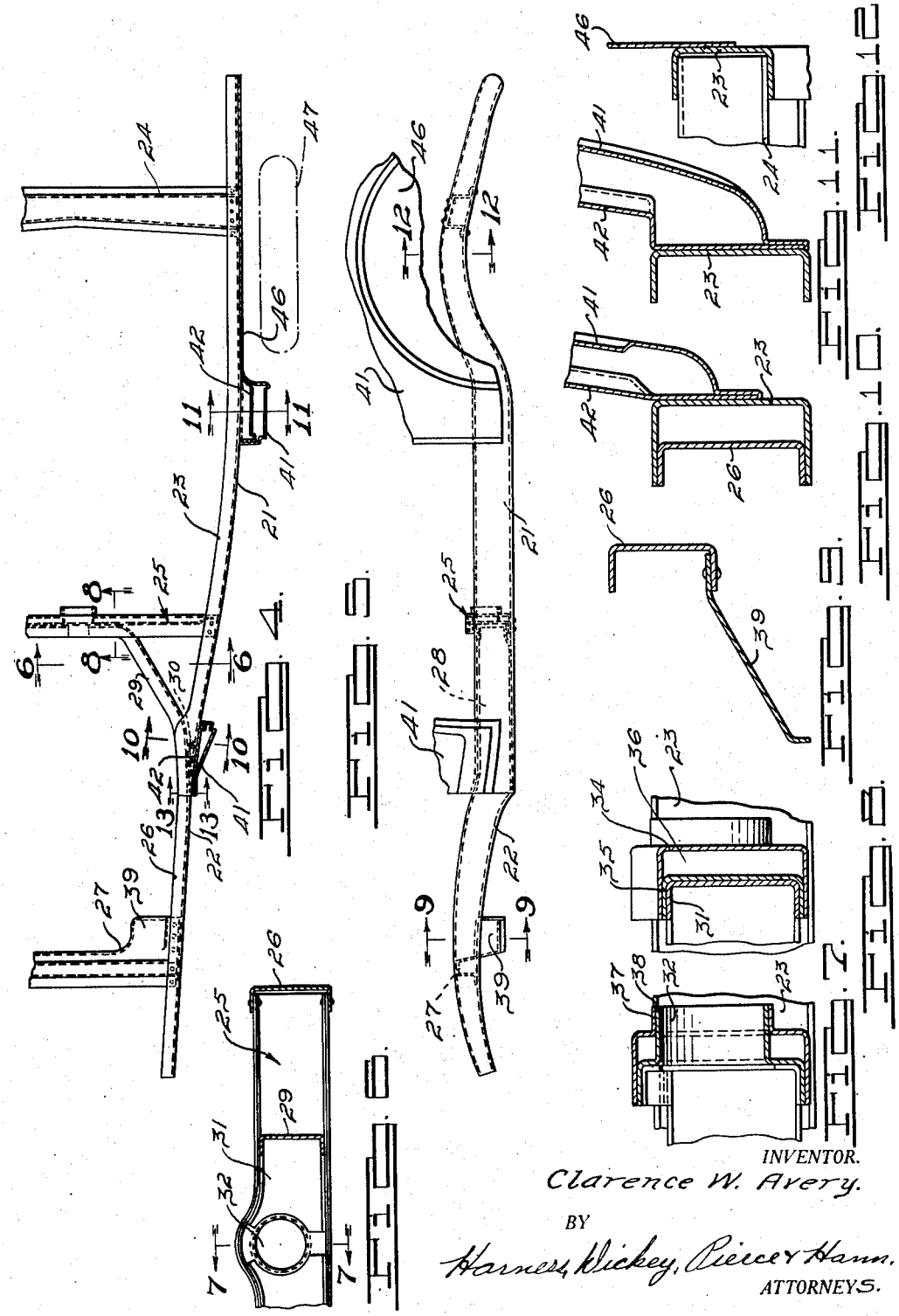

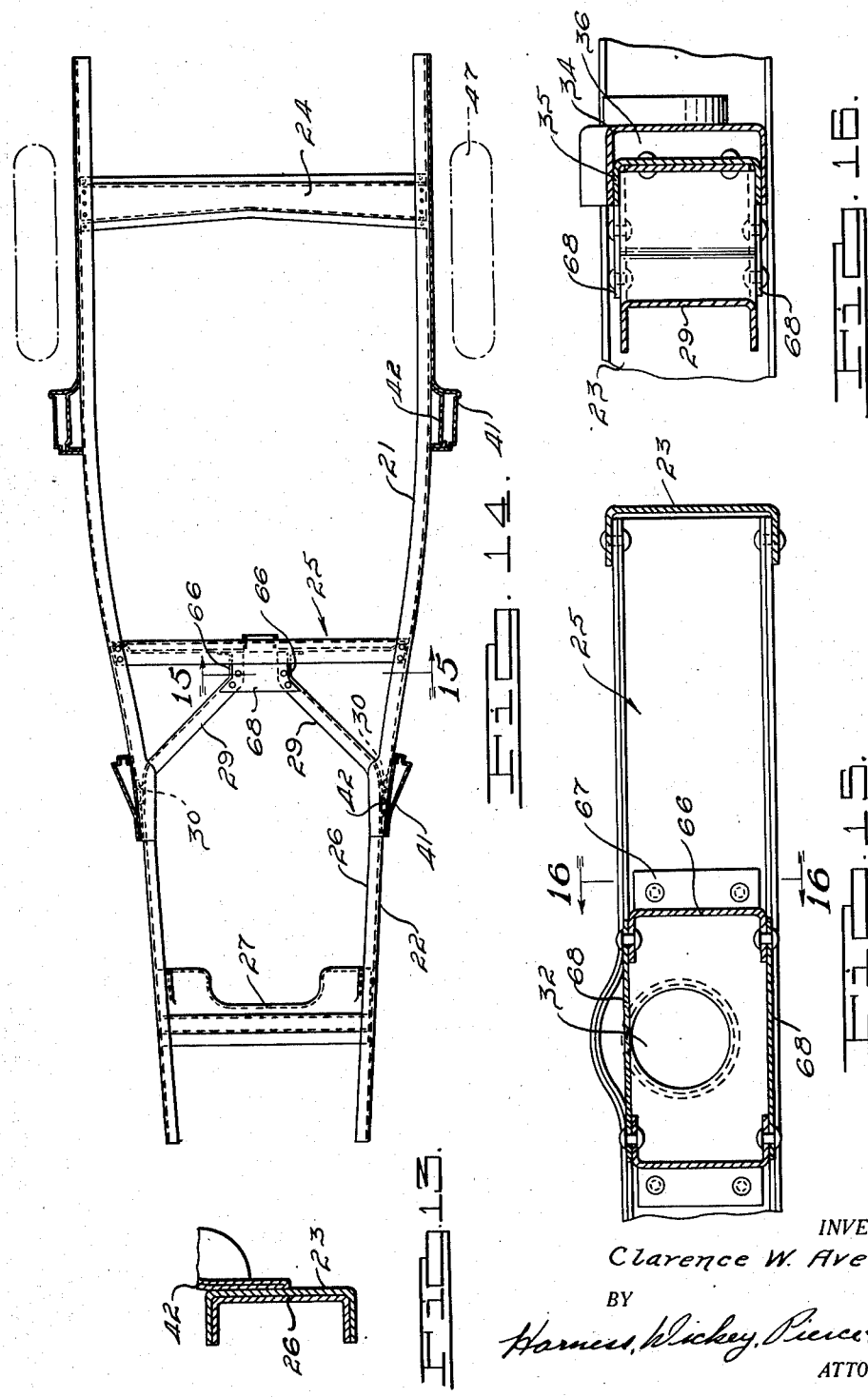

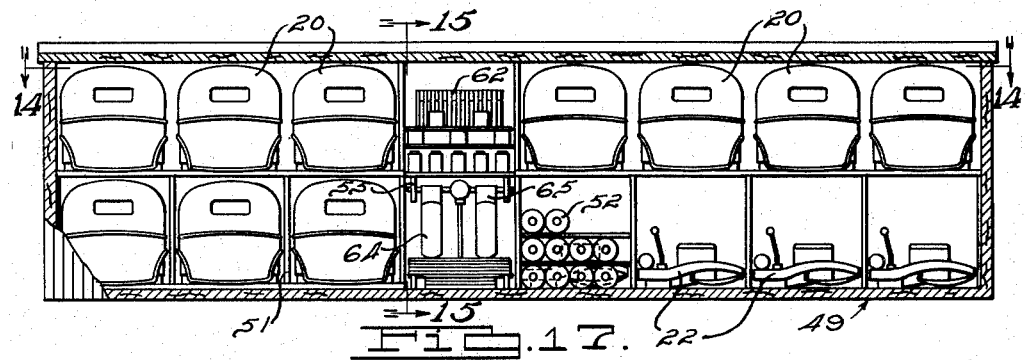

Patented May 31, 1938

2,119,193

UNITED STATES PATENT OFFICE 2,119,193

VEHICLE BODY AND CHASSIS CONSTRUCTION

Clarence W. Avery, Detroit, Mich.

Application April 22, 1933, Serial No. 667,362

10 Claims. (Cl. 280—106)

My invention relates to an automobile construction, partly to a new and novel construction which permits the assembly of the various parts of the automobile in sub-assembly units which are particularly designed to facilitate shipping of automobiles in freight cars and vessels, by more completely and efficiently utilizing the storage space available in railroad freight cars and ships, and making it possible to eliminate a large part of the assembly expense at assembly plants or points remote from the manufacturing plant.

My invention also includes novel features of construction in the under-framing or chassis frame of the automobile by providing a chassis frame separable into two parts at a given point which provides one sub-assembly unit upon which the engine, hood, front wheels and springs and transmission may be mounted, and the second sub-assembly upon which the body, rear wheels and springs, propeller shaft and differential may be mounted. The chassis frame being so constructed and arranged that after the various parts mentioned or such of them as may be desirable are mounted thereon, the complete automobile may be assembled by attaching the front portion of the chassis frame to the rear portion thereof by simple and easily manipulated means.

The value of such a construction becomes apparent when it is considered that by means thereof all of the main parts of the automobile may be assembled at the manufacturing plant into these two main sub-assembly units, which may then be stored in railroad cars or in ships for transportation in considerably less space than has heretofore been possible.

It has heretofore been the practice to make the chassis frame of an automobile in one part and to ship the same separately from the body, the body being sometimes assembled in final form for shipment, and at other times shipped in knocked down condition which requires considerable labor and equipment at the final assembly point. It has been the practice of some manufacturers to ship automobiles to various assembly points throughout the world in a knocked down condition, that is with the major parts such as the chassis frame, the engine and the body all separate. The bodies also have been and are being shipped in knocked down condition, the various parts being separated to enable them to be more economically packed in transportation storage space available. This frequently results in a confusion of parts, and as stated, the necessity for considerable labor and equipment at the assembly points. When the automobiles are shipped completely assembled, as is frequently done, it is only possible to place three or four complete automobiles in the railroad freight cars such as are now in common use. By means of the construction provided by my invention, it is possible to ship a substantially larger number of automobiles per freight car and to thereby effect a very substantial saving in freight charges in addition to eliminating a large part of the labor and the equipment necessary at assembly points remote from the manufacturing plant.

My invention also includes novel features of construction of the chassis frame and of the body itself, prominent among which are the chassis construction wherein the trussing and reinforcing of the normally weaker points are provided by the combination and construction of the separable parts in the region of their joinder, and the construction whereby the body is joined directly to the chassis frame without the use of separate body sills or under framing, although body construction employing separate sills may be used with the other features of the invention if desired.

Other objects and features of novelty of my invention will be either specifically pointed out or will become apparent when referring, for a better understanding of my invention, to the following description taken in conjunction with the accompanying drawings, wherein:

Figure 1 is an exploded view of an automobile body and a separable chassis frame embodying features of my invention, Fig. 2 is a view of the elements illustrated in Fig. 1, in assembled relation, Fig. 3 is an enlarged sectional view of the structure illustrated in Fig. 2, taken on the line 3—3 thereof, Fig. 4 is a broken plan view of the chassis elements illustrated in Fig. 1, in assembled relation, Fig. 5 is a view in side elevation of the structure illustrated in Fig. 4, Fig. 6 is an enlarged sectional view of the structure illustrated in Fig. 4, taken on the line 6—6 thereof, Fig. 7 is an enlarged sectional view of the structure illustrated in Fig. 6, taken on the line 7—7 thereof, Fig. 8 is an enlarged sectional view of the structure illustrated in Fig. 4, taken on the line 8—8 thereof, Fig. 9 is an enlarged sectional view of the structure illustrated in Fig. 5, taken on the line 9—9 thereof, Fig. 10 is an enlarged sectional view of the structure illustrated in Fig. 4, taken on the line 10—10 thereof, Fig. 11 is an enlarged sectional view of the structure illustrated in Fig. 4, taken on the line 11—11 thereof, Fig. 12 is an enlarged sectional view of the structure illustrated in Fig. 5, taken on the line 12—12 thereof, Fig. 13 is an enlarged sectional view of the structure illustrated in Fig. 4 taken on the line 13—13 thereof.

Fig. 14 is a plan view of a separable chassis frame showing a modified form thereof, Fig. 15 is an enlarged sectional view of the structure illustrated in Fig. 14, taken on the line 15—15 thereof, Fig. 16 is a sectional view of the structure illustrated in Fig. 15, taken on the line 16—16 thereof, Fig. 17 is a sectional view of a freight car, in side elevation, illustrating a method of storing automotive vehicles for shipment, Fig. 18 is a sectional view of the structure illustrated in Fig. 13, taken on the line 18—18 thereof, and Fig. 19 is an enlarged sectional view of the structure illustrated in Fig. 13, taken on the line 19—19 thereof.

Referring to Fig. 1, I have illustrated an automobile body 20 and a rear portion 21 and a front portion 22 of a chassis frame. The body is preferably made up of a plurality of formed stampings as a unit, either out of one or a plurality of sheets of metal which are welded together to form a body, as illustrated at 20 in the figure. This type of body is more or less a shell and requires a support at the bottom which heretofore assumed the form of sills which were welded or otherwise secured to the bottom edge of the body shell. In the present instance the side sills are entirely eliminated and the body is attached directly to the chassis frame. In the figure, I have illustrated only the rear portion of the chassis frame as being attached to the body, it is to be understood that in the broad aspect of the invention, the body may be attached to a full length of frame to produce the novel sections and constructions, which will be more particularly pointed out hereinafter.

The body is shown as being attachable to the rear portion 21 of a chassis frame to have that portion of the frame of substantially the length of the body, so that when the frontwardly extending portion 22 is removed therefrom the overall length of the remaining construction is that of the body, which will be the minimum dimension required for storage space for shipment. After the chassis frame has been welded or otherwise secured to the body to form the complete body unit which is independent of the trimmings, the chassis portion 22 may be attached, preferably by bolts so that it may be readily removed from the rear portion 21 of the chassis frame. It is to be understood that in this figure, the body may be provided with sills which engage the chassis frame portion in a conventional manner.

In Fig. 2 I have illustrated a body assembled to form a complete structure, with the body sills eliminated from the assembly. When, heretofore, attempting to ship bodies which were built on sills separate from the chassis frame, practically no saving in cost resulted and the ultimately assembled body was never satisfactory because the assembly required a manufacturing operation in view of the employment of anti-squeak material between the chassis frame and sills and in view of the finish required after such assembly. In the present instance I obtain a greater saving in shipping costs from that secured when separate bodies, built on side sills, were so shipped in view of the separation of the chassis frame and the elimination of the finishing operation and body assembly which requires a factory operation.

The rear section 21 of the chassis frame as illustrated in Fig. 4, comprises the right and left hand side member 23, the left hand portion only being shown, it being understood that the right hand side is the same as that of the left, except for a construction being of the opposite hand. The two side members 23 are interconnected by a rear brace 24 and a front brace 25, being riveted or otherwise secured to the side members. The front section 22 of the chassis comprises the right and left hand side elements 26 which are interconnected by a cross brace 27. The side members 26 are reduced in width at 28 for engagement within the channel portion of the element 23, as more clearly illustrated in Fig. 13. Owing to the slope of the member 23 at their front ends, inwardly toward each other; filler elements 30 are secured to the inner surface of the elements 23 to be engaged by the webs of the elements 26, to strengthen the joints therebetween and to permit the chassis portion to be readily separated. When so joined together the front elements 26 and the rear members 23 form the continuous chassis frame as more clearly illustrated in Fig. 5. It is to be understood that the cross braces 27 and 24 are of conventional form and will not be described in detail.

The member 26 is bent inwardly beyond the junction with the front end of the side element 23 to form an angularly disposed brace portion 29, as illustrated in Fig. 4. The end 31 is further bent angularly to extend laterally of the vehicle in the plane of the brace 25 with which it engages, as illustrated in Fig. 5, and to which it is secured by bolts, not shown. The end is enlarged to follow the increased area of the element 25 which has a central opening 32 therethrough through which the propeller housing or shaft extends. In this manner the front portion of the chassis 22 engages the rear portion 21 at the front end of the members 23 and at the central portion of the cross brace 25. The angularly disposed portion 29 materially strengthens the chassis frame, in the same manner as the X-member now conventionally employed in the art.

It will be noted that the members 23, 26 and the cross braces 24, 25 and 27 are all of channel section for producing the maximum strength for a minimum weight and that the elements 23 and 26 are inwardly presenting. In Figs. 7 and 8, I have more clearly illustrated the construction of the brace 25 which is made up of two channel elements 34 and 35 disposed in telescoping relation to each other and welded or otherwise secured together to form the box section construction having the space 36 therebetween. The opening 32 is formed by the telescoping annular flange portions 37 and 38 which are welded or otherwise secured together to add further strength to the construction. The portions 31 of the side members 26 are of such overall outside dimension as to telescope within the channel member 35 to be in intimate engagement therewith. Further strength is added to the cross brace 27 by the outwardly and downwardly extending portions 39 which increase the area of engagement of the brace with the side portion 26 of the front chassis section 22.

In Figs. 10 and 13, I have illustrated a section of the body and frame, through the portions 21 and 22 thereof, with the element 26 in telescoped relation with the member 23. The outer and inner panel portions 41 and 42, respectively, forms the front door pillar illustrated as being welded together and to the outer surface of the web of the channel member 23. The box section structure formed by the panels strengthens the front pillar construction and by having both the front and rear pillar portions secured to the outer surface of the web of the member 23 the support for the pillar is materially strengthened.

In Fig. 11, I have illustrated a section of the body taken through the rear door pillar which is similar in construction to the section at the front door pillar wherein the inner panel portion 42 forms a box section structure with the outer panel portion 41, both of which are joined together and to the outer surface of the web of the channel element 23 to produce strength to the pillar and to the joint formed with the chassis frame portion.

In Fig. 3, I have illustrated a section of the body and sill taken between the two door pillars illustrated in section in Figs. 10 and 11, wherein the panel portion 43 extends between the outer panel portions 41 preferably as a separate unit, although it may be an integral portion of the outer panel 41, when the outer panel is stamped from a single sheet of material. The panel portion 43 is constructed to form a rabbet 44 in which a door 45 is recessed and which is further extended inwardly to be secured to the top flange of the element 23 and which is extended downwardly to unite with the web of the element to form a box section structure therewith, which strengthens the panel portion 43 as well as the chassis portion 23.

In Figs. 4, 5 and 12, I have illustrated a wheel housing panel 46 which is recessed inwardly of the body for receiving a wheel 47, and which extends along the outer surface of the web portion of the frame element 23 and is preferably welded directly thereto. In this manner the chassis portion 23 is utilized as the sill of the body being united directly to the panels of the body to form the complete body assembly, such assembly is unique in that the overall dimension of the body is no greater than that of a similar body when built directly on the sills. This construction eliminates the anti-squeak and other material which was employed between the chassis frame and body sills, as well as the bolts for securing the sill to the chassis frame. This elimination not only saves the material and labor heretofore required when a separate sill was employed, but permits the chassis frame to be separated at the front of the body to permit the automobile to be knocked down for shipping purposes.

In Fig. 14, I have illustrated a modified form of connection between the front chassis frame 22 and rear chassis frame section 21 wherein all parts are the same except for the ends of the elements 26 which are constructed in a different manner from that illustrated in Figs. 4 to 8. The elements 26, after being bent inwardly at 29, are bent parallel to the longitudinal center line of the frame at 66 and are spaced apart, as more clearly illustrated in Fig. 15. The terminal ends of the section 66 are bent outwardly at 67 and are bolted or otherwise releasably secured to the cross brace 25. Gusset plates 68 join the flanges of the section 66 frontwardly of the flange of the element 35 of the brace 25 to strengthen the rear end of the element 26. Besides strengthening the end, this construction provides an opening through which the propeller housing and/or shaft communicates with the aperture 32 in the cross brace 25. Otherwise the construction is similar to that illustrated and described in regard to the aforementioned figures.

The object in either construction is to provide a sectional chassis frame, the elements of which, when united, form a unit construction having at least as much, if not more, strength than a chassis frame which is not so separable. As pointed out hereinabove, the utility of so constructing the chassis frame resides in reducing the overall dimension of the vehicle for shipping purposes, by having the vehicle separable at the front terminal end of the body with the body on the rear section of the chassis frame and the engine on the front section thereof.

Referring to Figs. 17, 18 and 19, I have shown one form of assembling bodies within a freight car to illustrate the advantages resulting from the construction hereinbefore described. A plurality of the bodies 20 are mounted within the freight car 49, six being illustrated in double-deck arrangement on the left hand portion of the car, while four others are mounted on an upper deck, on the right hand portion thereof. The front section of the chassis frame 22 along with engine and transmission 50 and wheel assembly 52 were removed from the rear section 21 so that the bodies could be moved into the positions illustrated on the floor of the car and on the supports 51 provided therefor. The bodies are blocked in position to prevent their movement during transit.

The front chassis frame sections 22, along with the attached engines and transmissions 50, are mounted on the floor of the right hand section, as clearly illustrated in Figs. 17 and 18. Three of the chassis sections 22 are mounted crosswise of the car, forming three rows with the tenth frame disposed in the central portion of the car along with the front wheels, axles and steering equipment 52, as illustrated more clearly in Fig. 17. The batteries, lights, fenders, rear wheels, propeller housings and shafts, along with the hoods, running boards, tires, radiators and any other removable portions of the automobile, are mounted in the remaining half of the door opening, as illustrated more clearly in Fig. 19 or in the space within the body.

While there are many ways in which the dismantled elements may be stored, for illustration, I have shown the springs 53, bumpers 54, rear wheels, housings and propeller shafts 55, and fenders 64 and 65, mounted on the floor of the left hand opening, while on the platform 56 thereabove, the batteries 57 and running boards 58 are mounted. On the platform 59 thereabove, lamps 61 and hoods 62 are stored. It is to be understood that the tires need not be mounted on the wheels, but are preferably disposed within the bodies wherein various elements, in addition, could be stored. The interior of the body is retained complete with seats, cushions, etc. therein.

In the manner illustrated, at least ten complete automobiles can be shipped in one freight car where heretofore a maximum of five only could be stored. This reduces the freight rate by half on each of the cars, which are knocked down in such manner that very little labor is required to place the automobiles in operating condition. It is to be understood that I do not wish to be limited particularly to the mounting of the bodies as herein shown and described, or the placing of the various elements as shown, since it is readily apparent that various changes could be made without departing from the spirit of the invention.

This novel construction not only reduces the shipping cost of the automobile, but materially decreases the cost of the vehicle in view of the elimination of the sill and the labor, material and time required to unite the body and sill on the chassis frame. The assembly is further unique in having the engine portion of the automobile, along with the front wheels, removable from the body and rear wheel frame section without dismantling the body. The construction not only retains the strength of the chassis but materially increases such strength in view of the cross braces provided by the assembly.

While I have described and illustrated but two embodiments of my invention, it will be apparent to those skilled in the art that various changes, omissions, additions and substitutions may be made therein without departing from the spirit and scope of my invention, as set forth in the accompanying claims.

I claim as my invention:

1. An automobile including, in combination, a rear sub-assembly comprising a body, running gear and rear wheels mounted on a chassis section which terminates in the front transverse plane of the body, a front sub-assembly unit comprising a chassis frame section supporting an engine, front running gear and wheels, said chassis sections having longitudinal and transversely disposed elements, and portions on at least one of said sections angularly disposed relative to the other section to form trussing and reinforced bracing for the two sections when united to join the sub-assembly units to form an automobile.

2. A sectional chassis frame including, in combination, a rear and front unit having longitudinal and transversely disposed elements, an angularly disposed portion on at least one of said units which forms trussing and bracing for the longitudinal and transverse elements when the units are joined together to form a complete chassis frame.

3. A chassis frame including, in combination, rear and front chassis sections composed of longitudinally and transversely disposed elements, portions of some of which elements on at least one of said sections being so disposed relative to the other section as to form braces between the longitudinal and transverse elements when the units are joined together to form a complete chassis frame.

4. A chassis frame including, in combination, rear and front sections having longitudinally and transversely disposed elements, the front portion of the rear section and the rear portion of the front section having complementary parts, and portions on at least one of said sections having parts which are complementary to portions of the other section to constitute bracing for the two sections when they are joined together to form a complete chassis frame.

5. In an automobile construction, the combination with a body and a chassis section extending substantially throughout the overall length of the body, a front chassis portion for supporting the engine, the rear portion of said front chassis portion and the forward portion of said rear chassis portion formed to engage each other in final assembled joints adjacent to the forward end of said body, and angularly disposed parts on said front portion for bracing the sides of said section and portion.

6. In an automobile construction, the combination with a two-part chassis frame, a rear part for supporting the body and terminating substantially at the forward end of the body, a front part adapted to support the engine and having angularly disposed rear extensions adapted to join with the rear chassis part beneath the front end of the body to provide diagonally braced framing therebeneath.

7. The combination with a chassis frame which is divided in two parts, of a rear part adapted to support a body and terminating substantially at its front end, and comprising longitudinally extending members beneath each side of the body and a transverse member adjacent to the front end of the body, a front part adapted to support the engine and comprising longitudinally extending members at each side of the engine having rearward extensions converging toward the major axis of said body, the longitudinally disposed members of said front part being engageable with the longitudinally disposed members of said rear part near the front end of the body, said converging extensions on said front part being engageable with the forward transverse member on said rear part to provide opposed triangular frames for supporting the front end of the body and for strengthening the region of joinder of said front and rear chassis parts.

8. A chassis frame for a vehicle body including, in combination, front and rear separable elements, said elements comprising longitudinally extending members with at least one cross brace therebetween, the rear portion of the front separable element converging to form braces for said frame when the elements are secured together with portions of the front element intermediate its ends engaging and mating with the front end of said rear separable element.

9. A chassis frame for a vehicle body including, in combination, front and rear separable elements, said elements comprising longitudinally extending members with at least one cross brace therebetween, the rear portion of the front separable element converging to form braces for said frame when the elements are secured together forming an opening through the center of the frame, intermediate portions of the front separable element being engageable with the front ends of said rear separable element to form continuous longitudinally extending members along the sides of the frame.

10. A chassis frame for vehicle bodies including front and rear chassis portions, longitudinally extending members of inwardly presented channel sections interconnected by at least one cross brace forming each said portion, the rear portion of the longitudinal extending members of the front section converging to join the cross brace of the rear portion to further brace the frame, centrally of the frame.

CLARENCE W. AVERY.